(12) United States Patent
Gast (10) Patent No.: US 8,509,128 B2
(45) Date of Patent: Aug. 13, 2013

(54) HIGH LEVEL INSTRUCTION CONVERGENCE FUNCTION

(75) Inventor: Matthew Stuart Gast, San Francisco, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 1119 days.

(21) Appl. No.: 11/970,484

(22) Filed: Jan. 7, 2008

(65) Prior Publication Data

US 2009/0073905 A1 Mar. 19, 2009

Related U.S. Application Data

(60) Provisional application No. 60/973,406, filed on Sep. 18, 2007, provisional application No. 60/978,401, filed on Oct. 8, 2007, provisional application No. 60/980,158, filed on Oct. 15, 2007, provisional application No. 60/985,910, filed on Nov. 6, 2007.

(51) Int. Cl.
  *H04B 7/00* (2006.01)
(52) U.S. Cl.
  USPC .......................................... 370/310
(58) Field of Classification Search
  None
  See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | De Couasnon et al. |
| 4,176,316 A | 11/1979 | DeRosa et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |

(Continued)

FOREIGN PATENT DOCUMENTS

| | | |
|---|---|---|
| EP | 1 542 409 A1 | 6/2005 |
| WO | WO 94/03986 | 2/1994 |

(Continued)

OTHER PUBLICATIONS

U.S. Appl. No. 11/326,966, filed Jan. 2006, Taylor.

(Continued)

*Primary Examiner* — Chi Pham
*Assistant Examiner* — Kouroush Mohebbi (57) ABSTRACT

A convergence engine may provide a high level message for a high level engine representative of multiple messages received by a network interface or other physical layer transmission device. The high level engine may access one or more high level messages via functions describing the state of a non-network-portal station.

19 Claims, 9 Drawing Sheets

(56) References Cited

U.S. PATENT DOCUMENTS

| | | |
|---|---|---|
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | Mcrae et al. |
| 4,894,842 A | 1/1990 | Brockhaven et al. |
| 4,901,307 A | 2/1990 | Gilhousen et al. |
| 4,933,952 A | 6/1990 | Albrieux et al. |
| 4,933,953 A | 6/1990 | Yagi |
| 4,995,053 A | 2/1991 | Simpson et al. |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,329,531 A | 7/1994 | Diepstraten |
| 5,418,812 A | 5/1995 | Reyes et al. |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,729,542 A | 3/1998 | Dupont |
| 5,742,592 A | 4/1998 | Scholefield et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,653 A | 10/1998 | Goss |
| 5,828,960 A | 10/1998 | Tang et al. |
| 5,838,907 A | 11/1998 | Hansen |
| 5,844,900 A | 12/1998 | Hong et al. |
| 5,872,968 A | 2/1999 | Knox et al. |
| 5,875,179 A | 2/1999 | Tikalsky |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 6,005,853 A | 12/1999 | Wang et al. |
| 6,011,784 A | 1/2000 | Brown |
| 6,041,358 A | 3/2000 | Huang et al. |
| 6,078,568 A | 6/2000 | Wright |
| 6,088,591 A | 7/2000 | Trompower |
| 6,115,390 A | 9/2000 | Chuah |
| 6,119,009 A | 9/2000 | Baranger et al. |
| 6,160,804 A | 12/2000 | Ahmed et al. |
| 6,188,694 B1 | 2/2001 | Fine et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,256,300 B1 | 7/2001 | Ahmed et al. |
| 6,256,334 B1 | 7/2001 | Adachi |
| 6,285,662 B1 | 9/2001 | Watannabe et al. |
| 6,317,599 B1 | 11/2001 | Rappaport et al. |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,404,772 B1 | 6/2002 | Beach et al. |
| 6,446,206 B1 | 9/2002 | Feldbaum |
| 6,470,025 B1 | 10/2002 | Wilson et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,567,146 B2 | 5/2003 | Hirakata et al. |
| 6,567,416 B1 | 5/2003 | Chuah |
| 6,580,700 B1 | 6/2003 | Pinard et al. |
| 6,587,680 B1 | 7/2003 | Ata-Laurila et al. |
| 6,614,787 B1 | 9/2003 | Jain et al. |
| 6,625,454 B1 | 9/2003 | Rappaport et al. |
| 6,631,267 B1 | 10/2003 | Clarkson et al. |
| 6,659,947 B1 | 12/2003 | Carter et al. |
| 6,678,802 B2 | 1/2004 | Hickson |
| 6,687,498 B2 | 2/2004 | McKenna et al. |
| 6,721,334 B1 | 4/2004 | Ketcham |
| 6,725,260 B1 | 4/2004 | Philyaw |
| 6,747,961 B1 | 6/2004 | Ahmed et al. |
| 6,760,324 B1 | 7/2004 | Scott et al. |
| 6,839,338 B1 | 1/2005 | Amara et al. |
| 6,839,388 B2 | 1/2005 | Vaidyanathan |
| 6,847,620 B1 | 1/2005 | Meier |
| 6,879,812 B2 | 4/2005 | Agrawal et al. |
| 6,937,566 B1 | 8/2005 | Forslow |
| 6,973,622 B1 | 12/2005 | Rappaport et al. |
| 6,978,301 B2 | 12/2005 | Tindal |
| 7,020,773 B1 | 3/2006 | Otway et al. |
| 7,024,394 B1 | 4/2006 | Ashour et al. |
| 7,035,220 B1 | 4/2006 | Simcoe |
| 7,062,566 B2 | 6/2006 | Amara et al. |
| 7,110,756 B2 | 9/2006 | Diener |
| 7,126,913 B1 | 10/2006 | Patel et al. |
| 7,155,518 B2 | 12/2006 | Forslow |
| 7,221,927 B2 | 5/2007 | Kolar et al. |
| 7,293,136 B1 | 11/2007 | More et al. |
| 7,350,077 B2 | 3/2008 | Meier et al. |
| 7,382,756 B2 | 6/2008 | Barber et al. |
| 7,421,487 B1 | 9/2008 | Peterson et al. |
| 7,440,416 B2 | 10/2008 | Mahany et al. |
| 7,475,130 B2 | 1/2009 | Silverman |
| 7,505,434 B1 | 3/2009 | Backes |
| 7,509,096 B2 | 3/2009 | Palm et al. |
| 7,529,925 B2 | 5/2009 | Harkins |
| 7,577,453 B2 | 8/2009 | Matta |
| 7,603,710 B2 | 10/2009 | Harvey et al. |
| 7,724,704 B2 | 5/2010 | Simons et al. |
| 7,844,298 B2 | 11/2010 | Riley |
| 7,856,659 B2 | 12/2010 | Keeler et al. |
| 8,140,845 B2 | 3/2012 | Buddhikot et al. |
| 8,161,278 B2 | 4/2012 | Harkins |
| 2002/0021701 A1 | 2/2002 | Lavian et al. |
| 2002/0052205 A1 | 5/2002 | Belostotsky et al. |
| 2002/0069278 A1 | 6/2002 | Forslow |
| 2002/0080790 A1 | 6/2002 | Beshai |
| 2002/0087699 A1 | 7/2002 | Karagiannis et al. |
| 2002/0095486 A1 | 7/2002 | Bahl |
| 2002/0101868 A1 | 8/2002 | Clear et al. |
| 2002/0116655 A1 | 8/2002 | Lew et al. |
| 2002/0174137 A1 | 11/2002 | Wolff et al. |
| 2002/0191572 A1 | 12/2002 | Weinstein et al. |
| 2003/0014646 A1 | 1/2003 | Buddhikot et al. |

| | | | |
|---|---|---|---|
| 2003/0018889 A1 | 1/2003 | Burnett et al. | |
| 2003/0107590 A1 | 6/2003 | Levillain et al. | |
| 2003/0120764 A1 | 6/2003 | Laye et al. | |
| 2003/0174706 A1 | 9/2003 | Shankar et al. | |
| 2003/0193910 A1 | 10/2003 | Shoaib et al. | |
| 2003/0204596 A1 | 10/2003 | Yadav | |
| 2004/0025044 A1 | 2/2004 | Day | |
| 2004/0029580 A1 | 2/2004 | Haverinen et al. | |
| 2004/0030777 A1 | 2/2004 | Reedy et al. | |
| 2004/0047320 A1 | 3/2004 | Eglin | |
| 2004/0054774 A1 | 3/2004 | Barber et al. | |
| 2004/0064560 A1 | 4/2004 | Zhang et al. | |
| 2004/0078598 A1 | 4/2004 | Barber et al. | |
| 2004/0095914 A1 | 5/2004 | Katsube et al. | |
| 2004/0095932 A1 | 5/2004 | Astarabadi et al. | |
| 2004/0120370 A1 | 6/2004 | Lupo | |
| 2004/0143428 A1 | 7/2004 | Rappaport et al. | |
| 2004/0184475 A1 | 9/2004 | Meier | |
| 2004/0221042 A1 | 11/2004 | Meier | |
| 2004/0230370 A1 | 11/2004 | Tzamaloukas | |
| 2004/0233234 A1 | 11/2004 | Chaudhry et al. | |
| 2004/0236702 A1 | 11/2004 | Fink et al. | |
| 2004/0246937 A1 | 12/2004 | Duong et al. | |
| 2004/0259555 A1 | 12/2004 | Rappaport et al. | |
| 2005/0025105 A1 | 2/2005 | Rue | |
| 2005/0030894 A1 | 2/2005 | Stephens | |
| 2005/0030929 A1 | 2/2005 | Swier et al. | |
| 2005/0058132 A1 | 3/2005 | Okano et al. | |
| 2005/0059405 A1 | 3/2005 | Thomson et al. | |
| 2005/0059406 A1 | 3/2005 | Thomson et al. | |
| 2005/0064873 A1 | 3/2005 | Karaoguz et al. | |
| 2005/0068925 A1 | 3/2005 | Palm et al. | |
| 2005/0073980 A1 | 4/2005 | Thomson et al. | |
| 2005/0078644 A1 | 4/2005 | Tsai et al. | |
| 2005/0097618 A1 | 5/2005 | Arling et al. | |
| 2005/0122977 A1 | 6/2005 | Lieberman | |
| 2005/0128989 A1 | 6/2005 | Bhagwat et al. | |
| 2005/0157730 A1 | 7/2005 | Grant et al. | |
| 2005/0163078 A1 | 7/2005 | Oba et al. | |
| 2005/0175027 A1 | 8/2005 | Miller et al. | |
| 2005/0180345 A1 | 8/2005 | Meier | |
| 2005/0180358 A1 | 8/2005 | Kolar et al. | |
| 2005/0181805 A1 | 8/2005 | Gallagher | |
| 2005/0193103 A1 | 9/2005 | Drabik | |
| 2005/0223111 A1 | 10/2005 | Bhandaru et al. | |
| 2005/0240665 A1 | 10/2005 | Gu et al. | |
| 2005/0259597 A1 | 11/2005 | Benedetotto et al. | |
| 2005/0273442 A1 | 12/2005 | Bennett et al. | |
| 2005/0276218 A1 | 12/2005 | Ooghe et al. | |
| 2006/0045050 A1 | 3/2006 | Floros et al. | |
| 2006/0143496 A1 | 6/2006 | Silverman | |
| 2006/0187878 A1 | 8/2006 | Calhoun et al. | |
| 2006/0200862 A1 | 9/2006 | Olson et al. | |
| 2006/0248331 A1 | 11/2006 | Harkins | |
| 2006/0285489 A1 | 12/2006 | Francisco et al. | |
| 2006/0292992 A1 | 12/2006 | Tajima et al. | |
| 2007/0011318 A1 | 1/2007 | Roth | |
| 2007/0086398 A1 | 4/2007 | Tiwari | |
| 2007/0171909 A1 | 7/2007 | Pignatelli | |
| 2007/0189222 A1 | 8/2007 | Kolar et al. | |
| 2007/0230457 A1 | 10/2007 | Kodera et al. | |
| 2007/0248009 A1 | 10/2007 | Petersen | |
| 2007/0286208 A1 | 12/2007 | Kanada et al. | |
| 2007/0297329 A1 | 12/2007 | Park et al. | |
| 2008/0013481 A1 | 1/2008 | Simons et al. | |
| 2008/0102815 A1* | 5/2008 | Sengupta et al. | 455/424 |
| 2008/0107077 A1 | 5/2008 | Murphy | |
| 2009/0059930 A1 | 3/2009 | Ryan et al. | |
| 2009/0198999 A1 | 8/2009 | Harkins | |
| 2009/0252120 A1* | 10/2009 | Kim et al. | 370/331 |
| 2010/0261475 A1* | 10/2010 | Kim et al. | 455/436 |
| 2012/0144462 A1 | 6/2012 | Pochop | |
| 2012/0204031 A1 | 8/2012 | Harkins | |

FOREIGN PATENT DOCUMENTS

| | | |
|---|---|---|
| WO | WO 99/11003 | 3/1999 |
| WO | WO 03/085544 A1 | 10/2003 |
| WO | WO 2004/095192 A2 | 11/2004 |
| WO | WO 2004/095800 A1 | 11/2004 |
| WO | WO 2010/130133 A1 | 11/2010 |

OTHER PUBLICATIONS

U.S. Appl. No. 11/330,877, filed Jan. 2006, Matta.
U.S. Appl. No. 11/331,789, filed Jan. 2006, Matta, et al.
U.S. Appl. No. 11/351,104, filed Feb. 2006, Tiwari.
U.S. Appl. No. 11/377,859, filed Mar. 2006, Harkins.
U.S. Appl. No. 11/400,165, filed Apr. 2006, Tiwari.
U.S. Appl. No. 11/445,750, filed May 2006, Matta.
U.S. Appl. No. 11/417,830, filed May 2006, Morain.
U.S. Appl. No. 11/417,993, filed May 2006, Jar et al.
U.S. Appl. No. 11/437,537, filed May 2006, Freund et al.
U.S. Appl. No. 11/437,538, filed May 2006, Zeldin.
U.S. Appl. No. 11/437,387, filed May 2006, Zeldin et al.
U.S. Appl. No. 11/437,582, filed May 2006, Bugwadia et al.
U.S. Appl. No. 11/451,704, filed Jun. 2006, Riley.
U.S. Appl. No. 11/487,722, filed Jul. 2006, Simons et al.
U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast, Mathew S.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/975,134, filed Oct. 2007, Aragon et al.
U.S. Appl. No. 12/077,051, filed Mar. 2008, Gast, Mathew S.
Acampora and Winters, IEEE Communications Magazine, 25(8):11-20 (1987).
Acampora and Winters, IEEE Journal on selected Areas in Communications. 5:796-804 (1987). SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standards Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13th Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.

Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
Puttini, R., Percher, J., Me, L., and de Sousa, R. 2004. A fully distributed IDS for MANET. In *Proceedings of the Ninth international Symposium on Computers and Communications 2004* vol. 2 (*Iscc"04*)—vol. 2 (Jun. 28-Jul. 1, 2004). ISCC. IEEE Computer Society, Washington, DC, 331-338.
Co-pending U.S. Appl. No. 11/648,359, filed Dec. 28, 2006.
Co-pending U.S. Appl. No. 12/077,051, filed Mar. 14, 2008.
Co-pending U.S. Appl. No. 12/113,535, filed May 1, 2008.
Co-pending U.S. Appl. No. 11/852,234, filed Sep. 7, 2007.
Co-pending U.S. Appl. No. 12/172,195, filed Jul. 11, 2008.
Co-pending U.S. Appl. No. 12/210,917, filed Sep. 15, 2008.
Co-pending U.S. Appl. No. 11/845,029, filed Aug. 24, 2007.
Written Opinion PCT/US07/19696 dated Feb. 29, 2008, pp. 1-5.
Written Opinion PCT/US08/010708 dated May 18, 2009, pp. 1-12.
Final Office Action Mailed Jan. 25, 2010, in Co-pending U.S. Appl. No. 11/845,029, filed Aug. 24, 2007.
Non-Final Office Action Mailed Jul. 9, 2009, in Co-pending U.S. Appl. No. 11/845,029, filed Aug. 24, 2007.
Non-Final Office Action Mailed Nov. 19, 2009, in Co-pending U.S. Appl. No. 11/648,359, filed Dec. 28, 2006.
Non-Final Office Action Mailed Jan. 21, 2010, in Co-pending U.S. Appl. No. 11/852,234, filed Sep. 7, 2007.
Non-Final Office Action Mailed Jun. 29, 2009, in Co-pending U.S. Appl. No. 11/852,234, filed Sep. 7, 2007.
Non-Final Office Action Mailed Jun. 1, 2010, in Co-pending U.S. Appl. No. 12/172,195, filed Jul. 11, 2008.
Notice of Allowance mailed Jun. 23, 2010, in Co-pending U.S. Appl. No. 11/648,359, filed Dec. 28, 2006.
Non-Final Office Action Mailed May 14, 2010, in Co-pending U.S. Appl. No. 11/845,029, filed Aug. 24, 2007.
Law, A., "New Service Discovery Protocol," Internet Citation [Online] XP002292473 Retrieved from the Internet: URL:/http://sern.uccalgary.ca/{ Iawa/SENG60921/arch/SDP.htm> [retrieved Aug. 12, 2004] the whole document.
International Search Report PCT/US2007/19696 dated Feb. 29, 2008; p. 1.
International Search Report PCT/US2008/010708 dated May 18, 2009; p. 1-2.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).
Sangheon Pack et al. "Fast-handoff support in IEEE 802.11 wireless networks," IEEE Communications Surveys, IEEE, NY, NY, vol. 9, No. 1, Jan. 1, 2007 (pp. 2-12) ISSN: 1553-877X.
U.S. Appl. No. 12/603,391, filed Oct. 21, 2009.
Office Action for U.S. Appl. No. 12/957,997, mailed Aug. 28, 2012.
Office Action for U.S. Appl. No. 11/784,307, mailed Sep. 22, 2009.
Final Office Action for U.S. Appl. No. 11/784,307, mailed Jun. 14, 2010.
Non-Final Office Action for U.S. Appl. No. 11/377,859, mailed Jan. 8, 2008.
Final Office Action for U.S. Appl. No. 11/377,859, mailed Aug. 27, 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Extended Search Report for European Application No. 11188566.1, mailed Jan. 30, 2012.
International Search Report and Written Opinion for PCT/US05/004702, mailed Aug. 10, 2006.

\* cited by examiner

HIGH LEVEL INSTRUCTION CONVERGENCE FUNCTION

RELATED APPLICATIONS

This Application claims priority to U.S. Provisional Patent Application No. 60/973,406, filed Sep. 18, 2007, and entitled "STATE CONVERGENCE" by Matthew Stuart Gast, which is incorporated herein by reference.

This Application claims priority to U.S. Provisional Patent Application No. 60/978,401, filed Oct. 8, 2007, and entitled "MAC STATE GENERIC CONVERGENCE FUNCTION" by Matthew Stuart Gast, which is incorporated herein by reference.

This Application claims priority to U.S. Provisional Patent Application No. 60/980,158 filed Oct. 15, 2007, and entitled "MAC STATE GENERIC CONVERSION FUNCTION" by Matthew Stuart Gast & Stephen McCann, which is incorporated herein by reference.

This Application claims priority to U.S. Provisional Patent Application No. 60/985,910 filed Nov. 6, 2007, and entitled "MAC STATE GENERIC CONVERSION FUNCTION" by Matthew Stuart Gast, which is incorporated herein by reference.

BACKGROUND

A network may include one or more network portals, each network portal providing network services. Such network portals may be coupled to switches and monitored by controlled by network software. Individuals connecting to the network may select a network portal to connect to.

In connecting to a network, a station may transmit a scan for available network portals. Such a scan may be responded to by one or more network portals. The one or more network portals may provide one or more responses. It may be cumbersome to consider the one or more responses, particularly so when there are many available network portals providing access to the network.

At times an individual may exceed the range of an network portal. Where a station is about to exceed the range of a NP and no NP is available for the station to connect to the station may lose network connectivity. Environmental conditions, or the movement of the station may contribute to a loss of network connectivity.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A convergence engine may provide a high level message for a high level engine, the high level message a product filtered from of a plurality of messages. The plurality of messages may be received by a network interface or other physical layer transmission device. The messages received may be 802.11 messages. The high level engine may access one or more high level messages via functions describing the state of the STA in terms of a state machine.

For a non network portal (NP) station (STA), the convergence engine may identify various high level states by filtering the plurality of messages. Based on a high level state, the convergence engine may provide a single high level message to a high level engine (HLE) indicating the state of the STA.

In a non-limiting example, the STA may change physical location, environmental conditions may change, network conditions may change, or other conditions may change causing the state machine to change states from one state to one of a plurality of states. In changing, a plurality of messages from network portals, other stations, or the STA itself may be generated or received. The convergence engine may filter the messages and identify a state of the STA. The convergence engine may produce a high level message indicating the present state and provide it to the HLE.

DETAILED DESCRIPTION

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

In wireless networking, one or more network portals (NPs) comprise a network. The NPs may use a variety of network protocols. In a non-limiting example, 802.11 is a protocol used by the network. An individual NP may have a coverage area, or range within the NP may communicate with a non-NP station (STA). At times the NP may be able to receive signals from the STA, but not be able to transmit to the STA. Contrarily, the STA may be able to transmit to the NP, but not receive signals from the NP. A STA is only in the coverage area of the NP where the NP and the STA may each transmit and receive signals from each other. In a non-limiting example, 802.11 is used and a STA is in range of a NP where all layer 2 setup activities have been completed and the STA is able to class 3 frames to peer Logical Link Control (LLC) entities.

Data transfer over one of the various protocols and via one of a plurality of NPs may be simply termed communication via a network. Multiple NPs may provide network connectivity as a common network having a common name. In some cases a NP providing a network may provide connectivity via more than one networking protocol. Providing connectivity via multiple protocols may be advantageous to provide access to STAs using various communication protocols. For one STA a protocol may be used, whereas for another other STA, a NP may use protocols unused by the STA. So long as the STA uses at least one protocol that is used by the NP, the STA may communicate with the STA, and may have network access.

At times multiple overlapping networks may provide connectivity to a STA via a plurality of NPs. The NPs may provide connectivity by one or more network interfaces. Nominally, a single network interface may communicate using a single protocol, and multiple network interfaces may be enabled to provide multiple protocols. Where convenient, the protocol of a single network interface may be, at times, changed.

Networks may overlap at parts. In some locations a single network may be available. However, even where a single network is available the network may be made available by more than one NP. In order to provide coverage free from "dead spots," or areas lacking network connectivity, a plurality of NPs providing the network may be provided having overlapping coverage areas.

An overlapping coverage area may be defined as an area in which a STA may transmit and receive data from more than one NP. NPs having overlapping coverage areas may, but need not necessarily provide overlapping coverage for the same network, such as where a first NP and a second NP of a single network provide overlapping coverage.

Different Networks may overlap where at least one NP of a first network and at least one NP of a second network have overlapping coverage areas. In a non-limiting example, such a first NP and a second NP need not communicate using the same network protocol, and thus, may provide overlapping network coverage using more than one communications protocol. A STA could communicate with a first NPs using a first network protocol and a second NP using a second network protocol and thus, transmit and receive data with two NPs using different network protocols. In the non-limiting example, the two NPs could not communicate with each other for lack of a common communications protocol.

The extent of overlapping coverage areas of different networks may be termed a border of networks. At the border of networks, overlapping coverage areas may provide network connectivity to a STA via more than one network and via more than one NP per network.

A mobile non-NP station (STA) may physically move requiring it to transition between NPs of a single network and between NPs of multiple networks. Low level intelligence of the STA may require NP level connectivity information, such as the address of each NP the STA encounters while changing NPs through one or more networks. However, it may not be necessary for high level decisions of the STA to require NP level information. In a non-limiting example, a high level engine may only be notified at transitions between networks, and may not be notified when changing NPs on the same network.

An engine nominally includes a processor and a memory, the memory storing instructions for execution by the processor.

Figure 1:
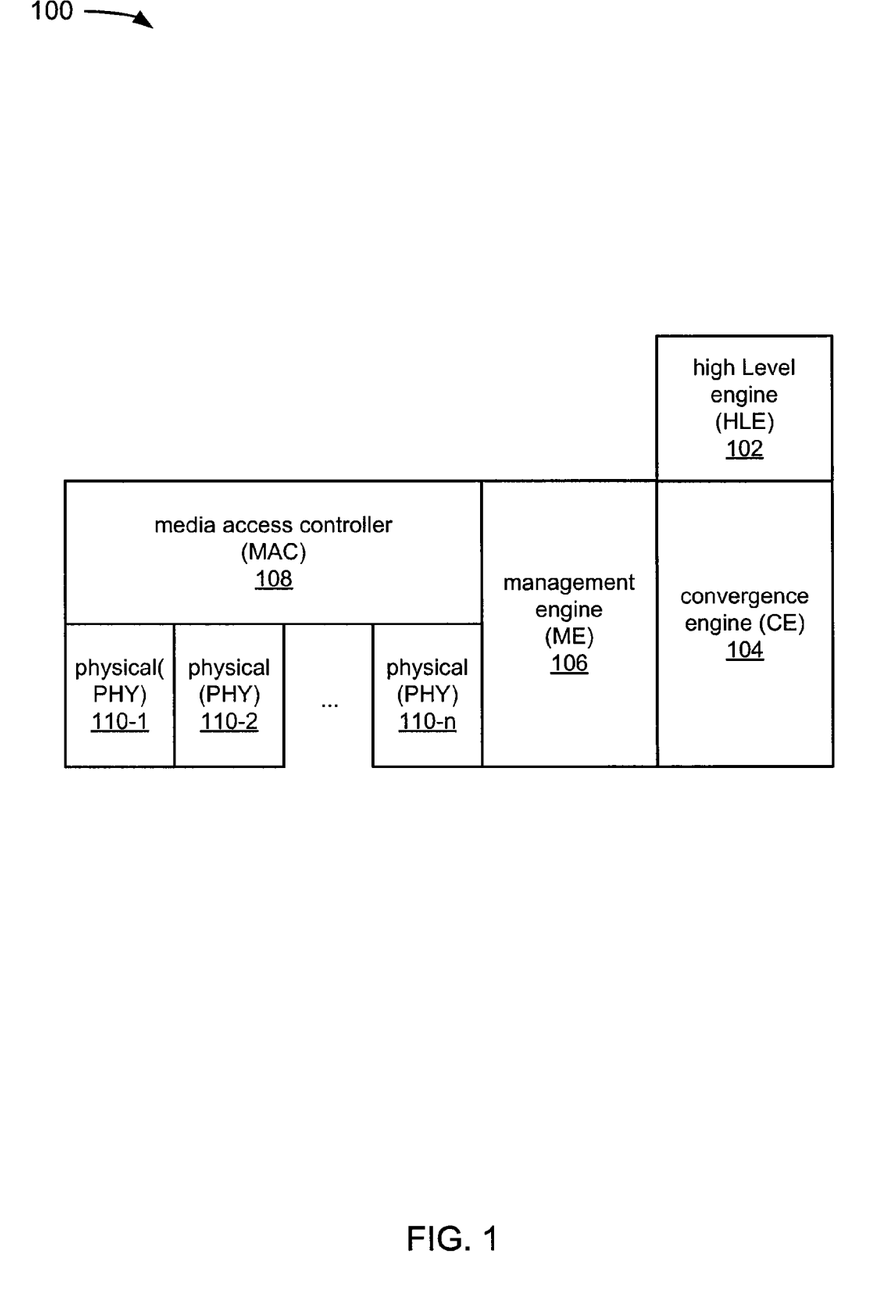
FIG. 1 depicts an example of a system for providing high level instructions.

FIG. 1 depicts an example of a system 100 for providing high level instructions. FIG. 1 includes high level engine (HLE) 102, convergence engine (CE) 104, management engine (ME) 106, media access controller (MAC) 108, physical layer device (PHY) 110-1, physical layer device (PHY) 110-2, and physical layer device (PHY) 110-n (collectively physical layer devices PHY 110).

As depicted, the elements of FIG. 1, may be included on either a STA or a NP. Further, the elements as depicted may be separated and recombined as is known or convenient. It may be possible to include all the elements depicted in a single unit however, it may not be necessary to do so. Elements depicted may be included on separate units, and the separate units may be connected by one or more networks.

The HLE 102 could be an internetworking gateway, router, mobility manager, or other engine benefiting from high level instructions. The high level engine may include one or more functions for interaction with a service access point (SAP). The functions may include messaging capability and decision making capability for high level network operations. In a non-limiting example, the high level network operations may include connect, disconnect, enable new network protocol and other high level operations.

The HLE 102 may determine connectivity at the network level such a high level engine may require information such as which network the NP is connected to. It may be desirable to provide information to a high level engine when network level events occur such as, in a non-limiting example, first connection, disconnection, changing networks, or other high level events in accordance with the state machine.

The CE 104 may include a filter, a message monitor and a message generator. The monitor may interact with a SAP operable to capture messages provided and received by the ME 106. The filter may be operable to identify messages having high level importance. The message generator may be operable to create a high level message based on the captured messages. However, many lower level message may be considered by the CE 104 without generating a message for the HLE 102. The convergence engine may sit between lower level network management such as the ME 106 and the HLE 102.

For a non-NP STA, the CE 104 may operate based on a state machine. The state machine may have several states such as "connected," "waning," "disconnected," and "standby." Connected may be interpreted as the STA having completed all setup activities and the STA is able to transmit and receive frames from peer entities.

"Waning" may be interpreted as a state of anticipation of disconnection. The STA may be anticipating that it will lose all links to all NPs within the network in a defined time interval, however, the STA is presently able to transmit and receive data from peer entities. In a non-limiting example, the predictive failure of the link may be due to explicit disassociation by a peer, imminent invalidation of cryptographic keys as usage limits (such as sequence counter exhaustion), or predictive signal strength algorithms indicating an impending loss of connectivity.

"Disconnected" may be interpreted as the state where a STA is unable to transmit and receive frames and the STA has no available higher level communications protocols. In a non-limiting example, the STA is unable to transmit 802.11 class 3 frames, and is therefore disconnected.

Standby may be interpreted as the STA is powered down, and is unable to communicate with any other STA.

The ME 106 may include sub-layer management entities such as a media access control (MAC) layer management engine (MLME), a physical layer management engine (PLME), and a system management engine (SME). Where the ME 106 includes multiple sub-layer management entities, service access points (SAPs) may provide a point for monitoring and controlling the entities. However, individual units may be divided and combined as is known or convenient and the SAPs may be placed as is known or convenient. The ME 106 may be operable to control the activities of a MAC layer as well as one or more physical layer devices (PHY).

The MAC 108 may include SAPs. The SAPs may provide information about messages passed between the MAC 108 and the PHYs 110. The PHYs 110 may be radios, although a wired, optical, or other physical layer connections may be used. There need not be a plurality of PHYs 110; a single PHY 110 may be the only PHY.

In operation, one or more messages may be received via the PHYs 110 and passed to the MAC 108 and the ME 106. The CE 104 may access the messages via SAPs. The CE 104 monitors and creates a message for the HLE 102 describing a high level event.

In a non-limiting example, the CE 104 may not generate a message for the HLE 102 where the STA changes NPs but remains connected to the same network. To the extent that the HLE 102 need not receive information about lower level network activity, messages about such lower level activity may be suppressed by the CE 104. The messages which reach the HLE 102 may be configured as is known or convenient.

In a non-limiting example, only high level network messages may be provided to the HLE 102. The HLE 102 may then provide high level messages carrying commands to lower levels. Advantageously, a high level engine may provide and receive messages associated with high level network activity, while lower level network events may be monitored and filtered for high level events by a convergence engine.

Figure 2:
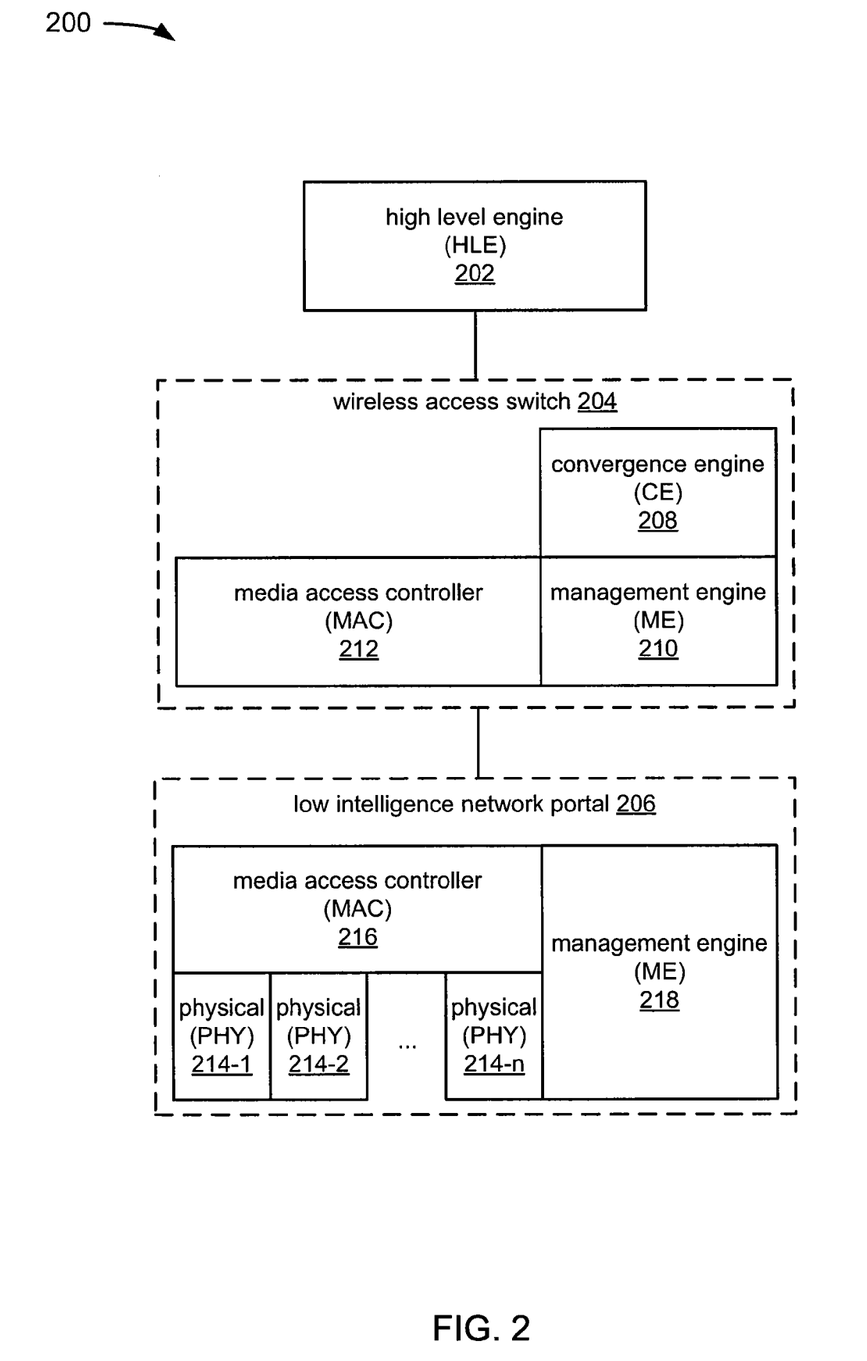
FIG. 2 depicts an example of a system for providing high level instructions separated into various hardware components.

FIG. 2 depicts an example of a system 200 for providing high level instructions separated into various hardware components. FIG. 2 includes high level engine 202, wireless access switch 204, and low intelligence network portal 206.

In the example of FIG. 2, the HLE 202 may be a high level management system including both hardware and software. The HLE 202 may be a centralized unit in control over a plurality of network portals via a plurality of wireless access switches.

The wireless access switch 204 includes CE 208, ME 210, and MAC 212. The wireless access switch 204 provide mid-level control and management of network portals as well as provide network connectivity between network portals and the HLE 202. An implementation of a wireless access switch, provided by way of example but not limitation, includes a Trapeze Networks® Mobility Exchange® switch.

The low intelligence network portal 206 includes MAC 216, PHY 214-1, PHY 214-2, PHY 214-n (collectively PHYs 214), and ME 218. In the example of FIG. 2, a management engine is divided into the management engine 210 and the management engine 218. The management engine 210 includes mid-level functions associated with controlling a plurality of low intelligence network portals. The ME 218 includes functions for controlling low level operations of a plurality of PHYs and the MAC 216.

In the example of FIG. 2, a MAC is divided into the MAC 212 and the MAC 216. The MAC 212 includes functions for controlling a plurality of low intelligence network portals. The MAC 216 includes functions for interacting with a plurality of PHYs and may receive instructions from the ME 218 as well as from the MAC 212.

The CE 208 monitors the ME 210 including communications between the MAC 212 and the ME 210. The CE 208 filters the monitored messages and identify high level events. For high level events, the CE 208 may provide a high level message to the HLE 202.

In operation, a plurality of messages are received by one or more of the PHYs 214. The messages are communicated to the MAC 216 and the ME 218. The messages may be communicated to the MAC 212 and the ME 210 over a network connecting the low intelligence network portal 206 and the wireless access switch 204. The CE 208 monitors the messages and identifies a high level event. The CE 208 provides a high level message to the HLE 202 over a network connecting the HLE 202 with the wireless access switch 204.

Figure 3:
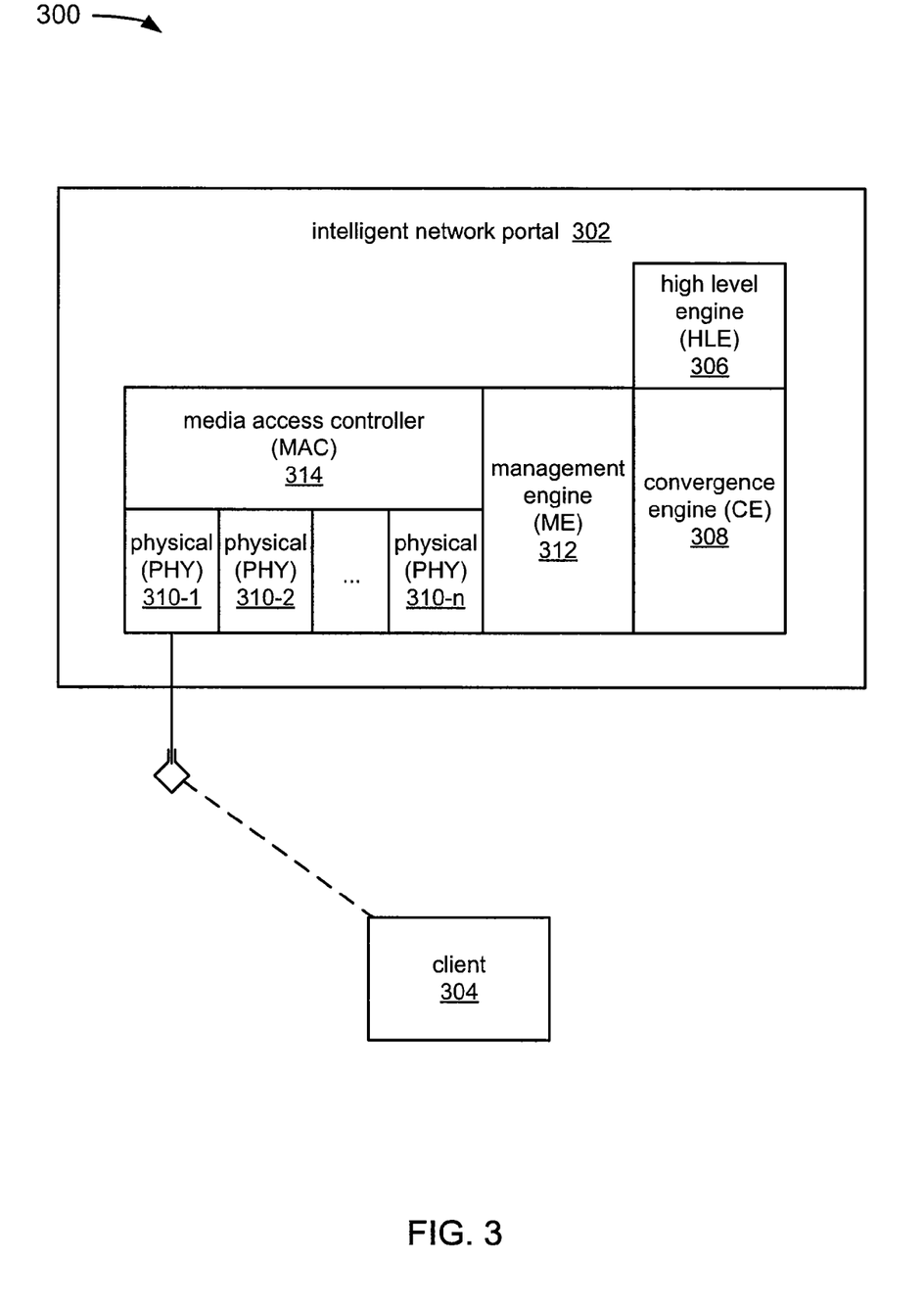
FIG. 3 depicts an example of a system including an intelligent network portal connected to a client.

FIG. 3 depicts an example of a system 300 including an intelligent network portal connected to a client. FIG. 3 includes intelligent network portal 300 and client 304.

The intelligent network portal 302 includes a HLE 306, a CE 308, a PHY 310-1, a PHY 310-2, a PHY 310-n (collectively PHYs 310), a ME 312, and a MAC 314. The PHYs 310 may be radios or other communications devices. The MAC 314 may include functions to control the PHYs 310. The ME 312 may include management functions to provide instructions to the PHYs 310 and the MAC 314. The CE 308 may include monitoring and reporting functions. The HLE 306 may include high level network management functions.

The client 304 may be a non-NP STA able to communicate via a wireless connection using a common protocol with PHY 310-1.

In the example of FIG. 3, the intelligent network portal 302 may be connected to the client 304. The client 304 may transmit messages to the PHY 310-1. The message may be passed from the PHY 310-1 to the MAC 314 and to the ME 312. The CE 308 may monitor messages passed between the MAC 314 and the ME 312 as well as messages from the PHYs 310 to the ME 312 via a SAP. The CE 308 may filter the messages for any high level events. For any high level events, the CE 308 may create and provide a high level message to the HLE 306.

Figure 4:
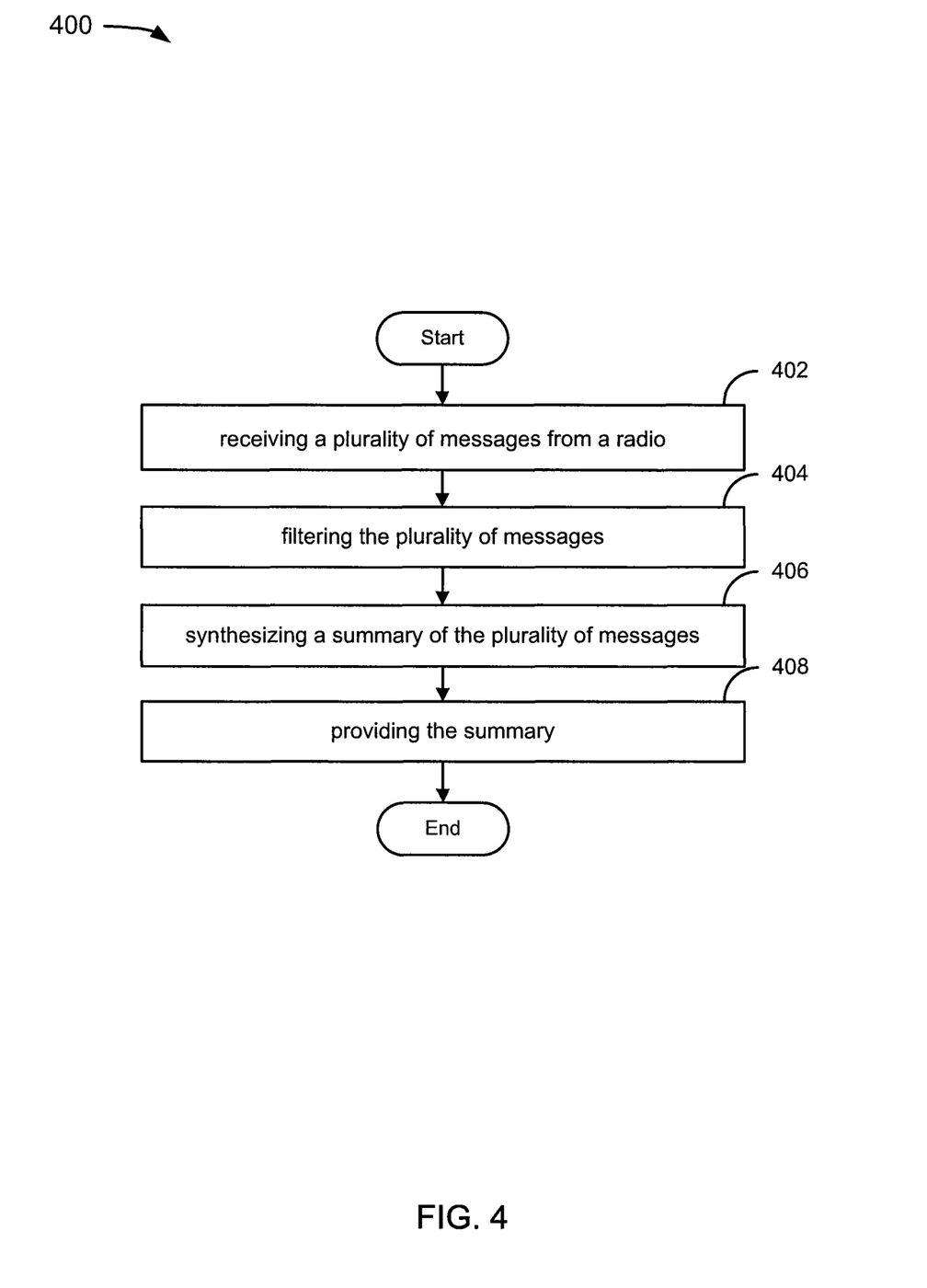
FIG. 4 depicts an example of a flowchart of a method for providing a summary of filtered messages.

FIG. 4 depicts an example of a flowchart 400 of a method for providing a summary of filtered messages. The method is organized as a sequence of modules in the flowchart 400. However, it should be understood that these and modules associated with other methods described herein may be reordered for parallel execution or into different sequences of modules.

In the example of FIG. 4, the flowchart starts at module 402 with receiving a plurality of message from a network interface. The messages may be received by one or more PHYs in conjunction with a MAC. A management engine may control the PHYs and the MAC. Service access points at the connections between the PHY and the MAC and the ME may be used to monitor the messages.

In the example of FIG. 4, the flowchart continues to module 404 with filtering the plurality of messages. The messages may be filtered for high level events such as in a non-limiting example, a disconnection or a waning connection. A high level event may be identified.

In the example of FIG. 4, the flowchart continues to module 406 with synthesizing a summary of the plurality of messages. The summary may identify the high level event observed, and/or may indicate the nature of the high level event. Details such as address may or may not be included.

In the example of FIG. 4, the flowchart continues to module 408 with providing the summary. The summary may be provided as a message to a HLE. The message may be transmitted to the HLE over a network, or where the HLE resides on common hardware, the message may be provided to the HLE by placing the message in memory accessible to the HLE. Having provided the summary, the flowchart terminates.

Figure 5:
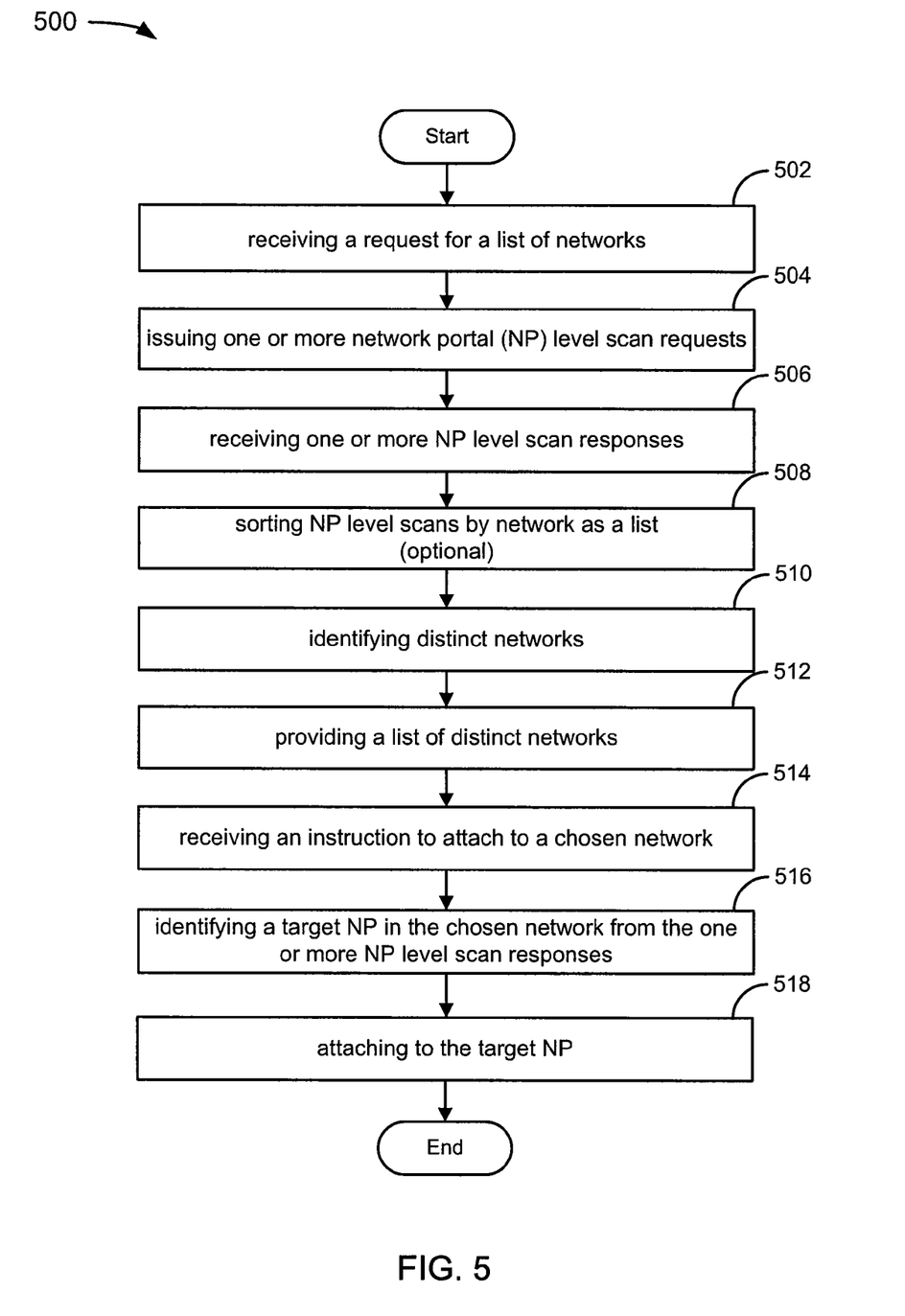
FIG. 5 depicts an example of a flowchart of a method for attaching a STA to a NP.

FIG. 5 depicts an example of a flowchart 500 of a method for attaching a STA to a NP. The method is organized as a sequence of modules in the flowchart 500. However, it should be understood that these and modules associated with other methods described herein may be reordered for parallel execution or into different sequences of modules.

In the example of FIG. 5, the flowchart starts at module 502 with receiving a request for a list of networks. The list of networks may include only distinct networks, where multiple NPs may represent a single network. In a non-limiting example, although 12 NPs are in range, all 12 NPs are associated with a single network. The list should include only the identifier of the single network.

In the example of FIG. 5, the flowchart continues to module 504 with issuing one or more NP level scan requests. The requests seek to identify NPs in range, regardless of their network. The scan requests may be issued in one or more communications protocols. In a non-limiting example, three different communications protocols are in use and 802.11 is one of the three protocols.

In the example of FIG. 5, the flowchart continues to module 506 with receiving one or more NP level scan responses. The responses may be received via one or more communications protocols. A plurality of NP level scan responses may be received identifying a plurality of NPs in range.

In the example of FIG. 5, the flowchart continues to module 508 with sorting NP level scans by network as a list. This step may be optional, however, in discovering distinct networks in the following module, it may be helpful to have the networks sorted as a list.

In the example of FIG. 5, the flowchart continues to module 510 with identifying distinct networks. Each distinct network may be associated with one or more NPs in range. The networks may provide connectivity via one or more than one communication protocol. In a non-limiting example, the list may be a summary of the plurality of messages.

In the example of FIG. 5, the flowchart continues to module 512 with providing a list of distinct networks. The list may be provided to a HLE. In a non-limiting example, providing the list is the same as providing a summary.

In the example of FIG. 5, the flowchart continues to module 514 with receiving an instruction to attach to a chosen network. The instruction may be received from a HLE. The HLE may have decided upon a network based on the list of distinct networks. The network selection may be made by network rather than by NP; the difference being that in selecting a network, the NP in use may vary, whereas in selection by NP, a particular NP may be used.

In the example of FIG. 5, the flowchart continues to module 516 with identifying a target NP in the chosen network from the one or more NP level scan responses. The NP may be selected based on NP selection criteria. In a non-limiting example, various criteria for selecting a NP may include signal strength, NP loading, communications protocol or other known or convenient criteria for selecting a NP.

In the example of FIG. 5, the flowchart continues to module 518 with attaching to the target NP. The attachment to the NP will provide network connectivity. Having attached to the target NP, the flowchart terminates.

Figure 6:
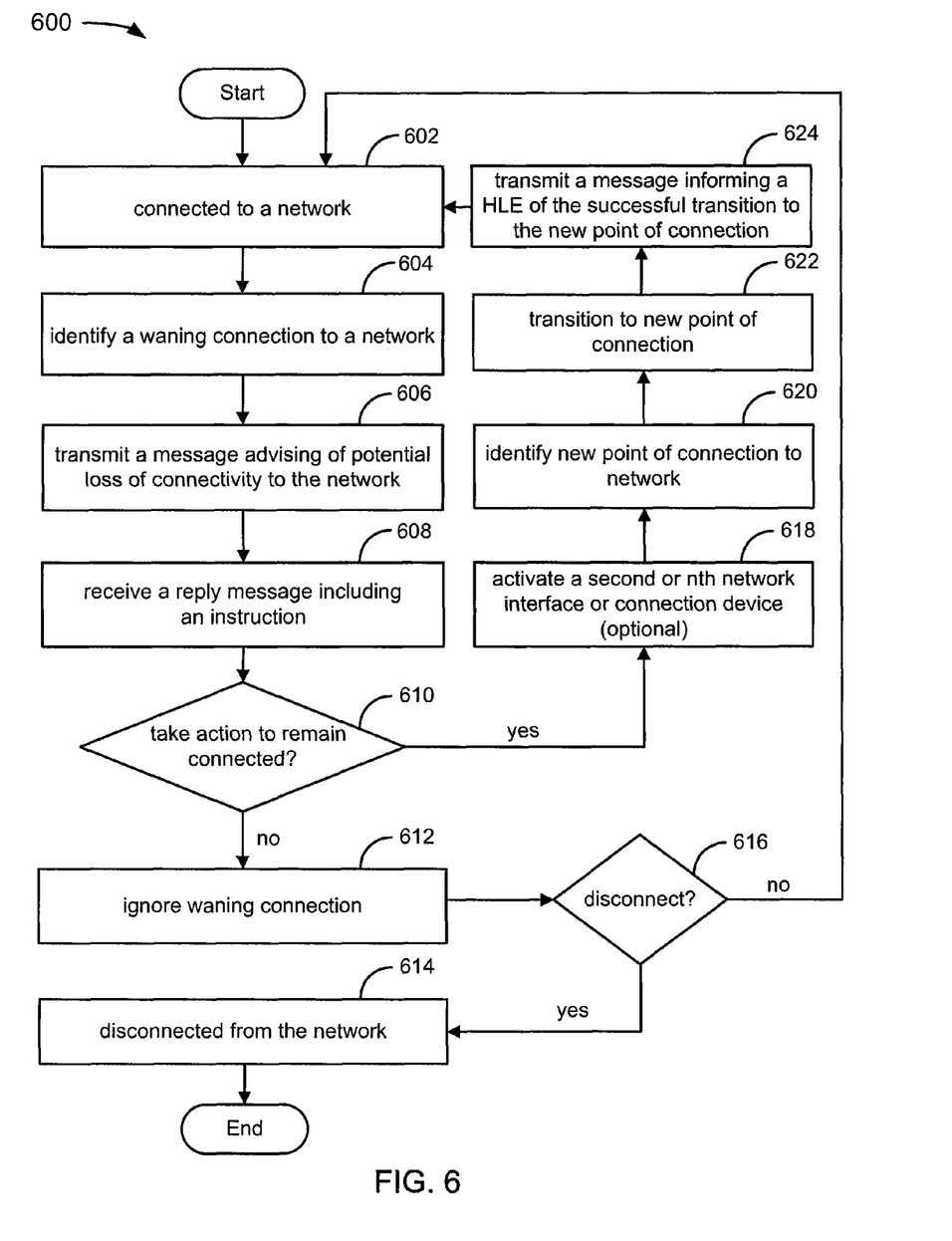
FIG. 6 depicts an example of a flowchart of a method for managing a waning connection.

FIG. 6 depicts an example of a flowchart 600 of a method for managing a waning connection. The method is organized as a sequence of modules in the flowchart 600. However, it should be understood that these and modules associated with other methods described herein may be reordered for parallel execution or into different sequences of modules.

In the example of FIG. 6, the flowchart starts at module 602 with a STA connected to a network. A STA may be connected to a NP providing connectivity to the STA via the network. In a non-limiting example, the STA may transmit class 3 802.11 frames to LLC peers on the network indicating that it is connected.

In the example of FIG. 6, the flowchart continues to module 604 with identifying a waning connection. "Waning" may be interpreted as a state of anticipation of disconnection. The STA may be anticipating that it will lose all links to all NPs within the network in a defined time interval, however, the STA is presently able to transmit and receive data from peer entities. In a non-limiting example, the predictive failure of the link may be due to explicit disassociation by a peer, imminent invalidation of cryptographic keys as usage limits (such as sequence counter exhaustion), or predictive signal strength algorithms.

In the example of FIG. 6, the flowchart continues to module 606 with transmitting a message advising of potential loss of connectivity to the network. The message warns of the waning connection and provides an opportunity to take action to remain connected.

In the example of FIG. 6, the flowchart continues to module 608 with receiving a reply message including an instruction. The instruction may determine whether or not action is taken to remain connected. In particular, if an action is to be taken the action may be specified by the message.

In the example of FIG. 6, the flowchart continues to module 610 with determining: take action to remain connected?

In the example of FIG. 6, if the decision at module 610 is yes, then the flowchart continues to module 618 with optionally activating a second or nth network interface or connection device. Where no NPs, or at least no desirable NPs are available via a certain network communications protocol, a second or nth network communications protocol may be used. NPs operating on the second or nth communications protocol may be made accessible, and a NP may be selected to use for all subsequent communications using the second or nth communications protocol.

In the example of FIG. 6, the flowchart continues to module 620 with identifying a new point of connection to the network. If another network connection exists, such as a wired connection or another NP on the current communications protocol is available, the new point of connection may be used.

In the example of FIG. 6, the flowchart continues to module 622 with transitioning to the new point of connection. The new point of connection is selected and established.

In the example of FIG. 6, the flowchart continues to module 624 with transmitting a message informing a HLE of the successful transition to the new point of connection. Having transmitted the message informing of the successful transition to the new point of connection, the flowchart returns to module 602, connected to a network.

In the example of FIG. 6, if the decision at module 610 is no, then the flowchart proceeds to module 612 with ignoring the waning connection. It may be assumed that the device will remain connected for some time period before disconnection.

In the example of FIG. 6, the flowchart proceeds to decision module 616 with deciding: disconnect? Disconnecting manually is an option; a device may choose to drop off of the network prior to allowing the waning connection to fail. Alternatively, the device may lose connectivity before such a decision can be made.

If the decision at module 616 is yes, or the device loses connectivity before the decision can be made, the flowchart proceeds to module 614 with disconnected from the network. In a non-limiting example, the device no longer may transmit class 3 frames.

If the decision at module 618 is no, then the flowchart continues to module 602 with connected to the network. The waning connection may be re-identified and action may be taken, or alternatively, the waning connection may be disregarded, and communication may continue up until network connectivity is lost. Having chosen to ignore the waning connection and having not been connected the flowchart loops while the device remains connected.

Figure 7:
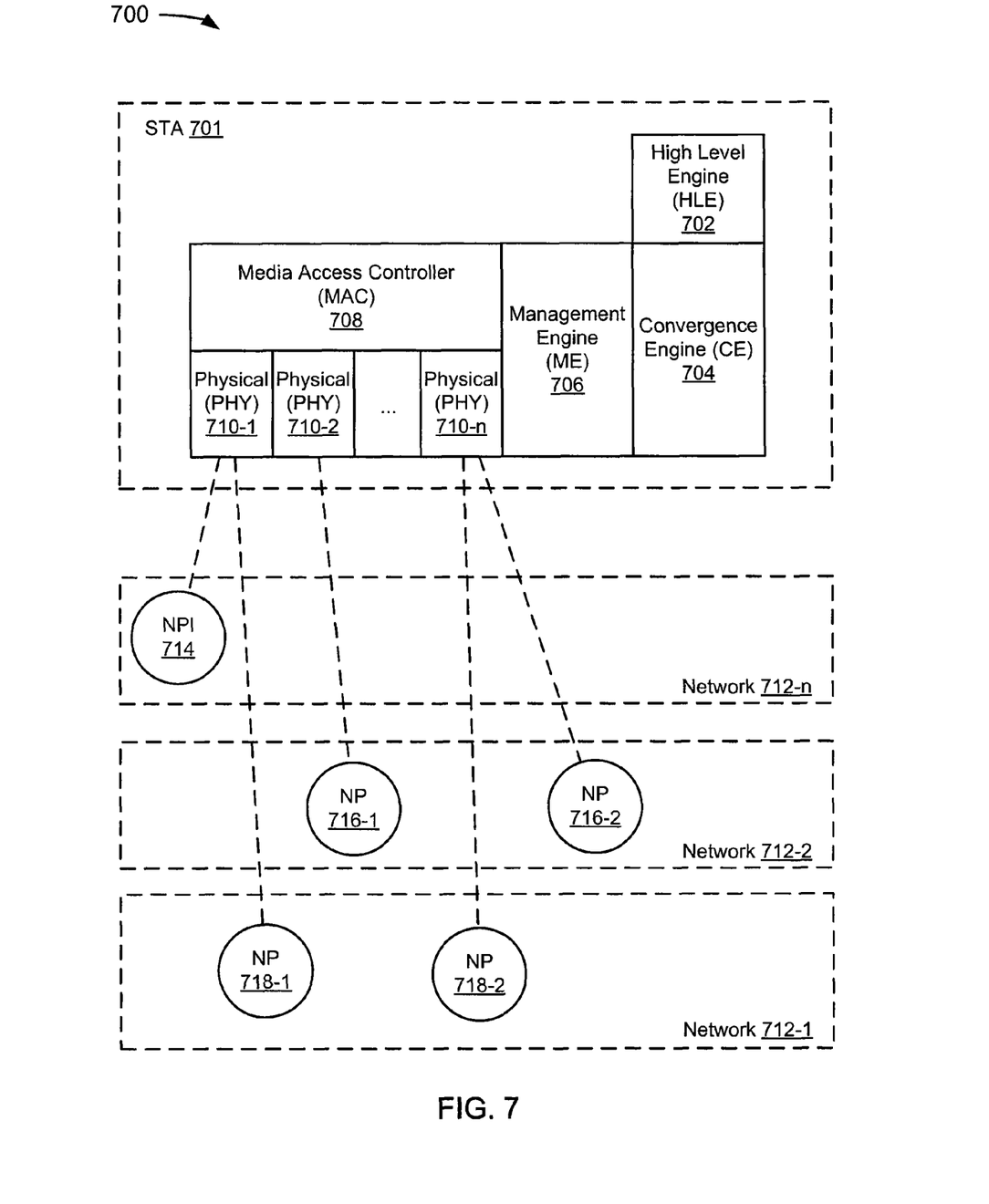
FIG. 7 depicts an example of a system including a STA in range of n overlapping networks.

FIG. 7 depicts an example of a system 700 including a STA in range of n overlapping networks. FIG. 7 includes STA 701, network 712-1, network 712-2, and network 712-*n* (collectively networks 712).

In the example of FIG. 7, the STA 701 includes HLE 702, CE 704, ME 706, MAC 708, PHY 710-1, PHY 710-2, and PHY 710-*n* (collectively PHYs 710). The HLE 702 may include a mobility manager, or other engine benefiting from high level instructions. The high level engine may include one or more functions for interaction with a service access point SAP. The functions may include messaging capability and decision making capability for high level network operations. In a non-limiting example, the high level network operations may include connect, disconnect, enable new network protocol and other high level operations.

The CE 704 may include a monitor and a message generator and a filter. The monitor may interact with a SAP operable to capture messages provided and received by the ME 106. The filter may be operable to identify messages having high level importance. The message generator may be operable to create a high level message based on the captured messages. The CE 704 may sit between lower level network management such as the ME 706 and the HLE 702.

The ME 706 may provide low level control over the MAC 708 and the PHYs 710. Messages passed between the ME 706, the MAC 708 and the PHYs 710 may be monitored by the CE 704.

Networks 712 may include n different networks operating on n distinct network protocols; one or more networks may operate on the same network protocol. As depicted network 712-*n* includes NP 714, network 712-2 includes NP 716-1 and NP 716-2 (collectively NPs 716), and network 712 includes NP 718-1 and 718-2 (collectively NPs 718).

In the example of FIG. 7, NP 714, NPs 716, and NPs 718 are all in range of the PHYs 710, and represent networks the STA 701 may connect to.

In operation, HLE 702 has issued an instruction to identify available networks, and network portal level scan requests have been transmitted. NP 714, NPs 716, and NPs 718 response to network portal level scan requests. Thus, five different messages associated with n different networks are received by the PHYs 710. The messages are provided to the ME 706 and the MAC 708. The CE 704 monitors the messages via SAPs between the PHYs 710, the MAC 708 and the ME 706. The CE filters the messages creating a list of distinct networks and identifies the networks 712 as n distinct networks. The list of n distinct networks is transmitted as a message to the HLE 702. The HLE may then select a network and provide an instruction to attach to a particular NP of the specified network.

Figure 8:
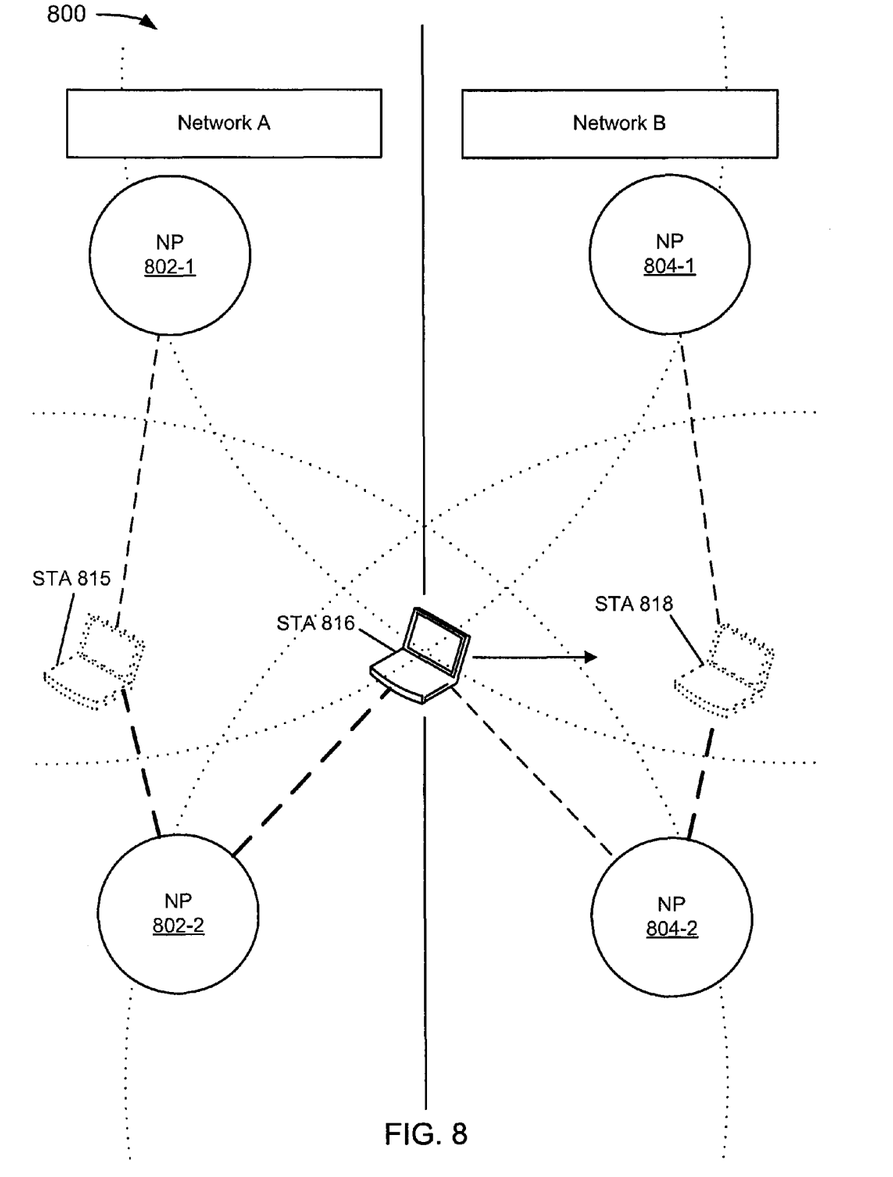
FIG. 8 depicts a non-limiting example of a system including two overlapping networks and station passing through a boundary of the networks.

FIG. 8 depicts a non-limiting example of a system 800 including two overlapping networks and station passing through a boundary of the networks. FIG. 8 includes NP 802-1, NP 802-2 (collectively NPs 801), NP 804-1, NP 804-2 (collectively NPs 804), STA 815, STA 816, and STA 818.

NPs 802 are each providing network connectivity to network A, and NPs 804 are each providing network connectivity to network B. Network A and network B operate using different communications protocols. The dotted lines indicate the extent of each NP's coverage area, and the dashed lines each indicate a connection between NPs and STAs.

The STA 815, the STA 816, and the STA 818 each correspond to different points in time for the same STA. In time, STA 815 is past, STA 816 is present and STA 818 is future. Each of STA 815, STA 816, and STA 818 include a CE and a HLE.

In operation, a user of the STA is carrying the STA passing through the boundaries of different networks having overlapping coverage areas. The STA 815 was first connected to the network A via NP 802-2 because STA 815 was closer to NP 802-2 and has a stronger signal. STA 815 could have connected to NP 802-1 if needed as STA 815 was in range of the NP 802-1. When presented with networks, STA 815's HLE was only presented with network A; notably both of NPs 802 responded to network portal level scan requests.

STA 816 has come into range of each of NP 802-1 and NP 804-2. STA 816 is presently connected to NP 802-2 as it was closest and had the strongest signal. However, the connection from NP 802-2 is waning as STA 816 is near the extent of the range of NP 802-2. STA 816 decides to enable a second network connection in the hopes of discovering an available NP prior to losing all network connectivity. STA 816's HLE issues a request for available networks. STA 816 issues a network portal level scan request for available network portals using the communications protocol of network B. NP 804-2 responds. STA 816 establishes a connection with NP 804-2, and begins communicating via NP 804-2. The STA 816's HLE will have been provided a message warning of the loss of network connectivity, but lower level messages regarding NP level connectivity will be filtered out.

The connection to NP 802-2 will be lost. However, STA 818 will have the connection with NP 804-2. As the user continues along, STA 818 will come into range of NP 804-1. Since the STA 818 will have a higher signal strength to NP 804-2, the STA 818 will remain connected to NP 804-2. Messages will not be passed to the STA 818's HLE as the NP 804-1 is on the same network as NP 804-2.

Figure 9:
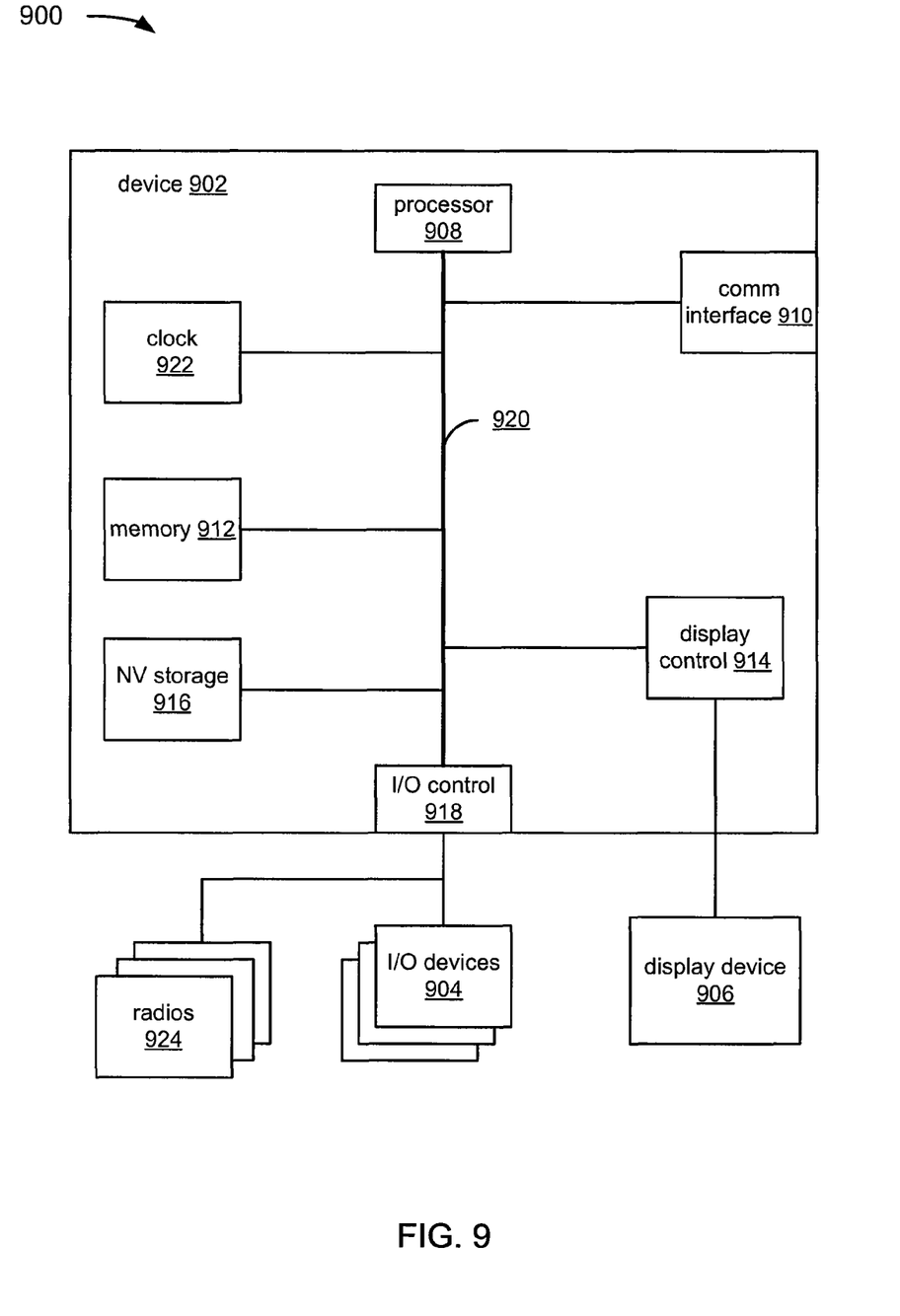
FIG. 9 depicts an example of a device for providing high level instructions.

FIG. 9 depicts an example of a device 900 for providing high level instructions. The system 900 may be a conventional computer system that can be used as a client computer system, such as a wireless client or a workstation, or a server computer system. The computer system 900 includes a device 902, I/O devices 904, radio 924, and a display device 906. The device 902 includes a processor 908, a communications interface 910, memory 912, display controller 914, non-volatile storage 916, I/O controller 918, clock 922. The device 902 may be coupled to or include the I/O devices 904 display device 906, and radio 924.

The device 902 interfaces to external systems through the communications interface 910, which may include a modem or network interface. It will be appreciated that the communications interface 910 can be considered to be part of the system 900 or a part of the device 902. The communications interface 910 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 908 may be, for example, a conventional microprocessor such as an Intel Pentium microprocessor or Motorola power PC microprocessor. The memory 912 is coupled to the processor 908 by a bus 920. The memory 912 can be Dynamic Random Access Memory (DRAM) and can also include Static RAM (SRAM). The bus 920 couples the processor 908 to the memory 912, also to the non-volatile storage 916, to the display controller 914, and to the I/O controller 918.

The I/O devices 904 can include a keyboard, disk drives, printers, a scanner, and other input and output devices, including a mouse or other pointing device. The display controller 914 may control in the conventional manner a display on the display device 906, which can be, for example, a cathode ray tube (CRT) or liquid crystal display (LCD). The display controller 914 and the I/O controller 918 can be implemented with conventional well known technology.

The non-volatile storage 916 is often a magnetic hard disk, flash memory, an optical disk, or another form of storage for large amounts of data. Some of this data is often written, by a direct memory access process, into memory 912 during execution of software in the device 902. One of skill in the art will immediately recognize that the terms "machine-readable medium" or "computer-readable medium" includes any type of storage device that is accessible by the processor 908 and also encompasses a carrier wave that encodes a data signal.

Clock 922 can be any kind of oscillating circuit creating an electrical signal with a precise frequency. In a non-limiting example, clock 922 could be a crystal oscillator using the mechanical resonance of vibrating crystal to generate the electrical signal.

Radios 924 may be any combination of known or convenient electrical components including by way of example, but not limitation, transistors, capacitors, resistors, multiplexers, wiring, registers, diodes or any other electrical components known or convenient.

The system 900 is one example of many possible computer systems which have different architectures. For example, personal computers based on an Intel microprocessor often have multiple buses, one of which can be an I/O bus for the peripherals and one that directly connects the processor 908 and the memory 912 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 912 for execution by the processor 908. A Web TV system, which is known in the art, is also considered to be a computer system, but it may lack some of the features shown in FIG. 9, such as certain input or output devices. A typical computer system will usually include at least a processor, memory, and a bus coupling the memory to the processor.

In addition, the system 900 is controlled by operating system software which includes a file management system, such as a disk operating system, which is part of the operating system software. One example of operating system software with its associated file management system software is the family of operating systems known as Windows® from Microsoft Corporation of Redmond, Wash. and their associated file management systems. Another example of operating system software with its associated file management system software is the Linux operating system and its associated file management system. The file management system is typically stored in the non-volatile storage 916 and causes the processor 908 to execute the various acts required by the operating system to input and output data and to store data in memory, including storing files on the non-volatile storage 916.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

What is claimed is:

1. A system implemented in at least one of a non-transitory medium with instructions for execution on a processing device, a processing device or a combination thereof, comprising:

a convergence engine configured to receive a request for a high level message from a high level engine (HLE);

the convergence engine configured to monitor a plurality of 802.11 messages provided by a network interface to a management engine (ME), the high level message being a message from the plurality of messages;

the convergence engine configured to filter the high level message from the plurality of messages, the high level message comprises a list of networks; the convergence engine configured to forward the high level message to the HLE in response to the request; and the convergence engine configured to receive from the HLE an instruction to associate with a network that is from the list of networks and that is selected by the HLE.

2. The system of claim 1, further comprising a media access controller configured to be coupled to the network interface and coupled to the ME, the media access controller configured to receive a message from the network interface and provides the message to the ME.

3. The system of claim 2, wherein the convergence engine is further configured to monitor messages passed between the ME, the media access controller (MAC) and the network interface.

4. The system of claim 1, wherein the convergence engine is configured to filter the high level message from the plurality of messages, the convergence engine is further configured to filter messages having a high level of importance from the plurality of messages.

5. The system of claim 1, wherein the convergence engine configured to filter the high level message from the plurality of messages, the convergence engine is further configured to filter out messages regarding network portal level connectivity from the plurality of messages.

6. A method comprising:
receiving a plurality of messages from a network interface;
filtering a high level message, the high level message being a message from the plurality of messages, the filtering including filtering out messages regarding network portal level connectivity, the high level message including a list of networks; and
providing the high level message to a high level engine.

7. The method of claim 6, wherein the plurality of messages are 802.11 messages.

8. The method of claim 6, wherein the plurality of messages are received by monitoring the messages as they are passed to a management engine by a network interface.

9. The method of claim 6, wherein the filtering the high level message further comprises the high level message having a high level of importance.

10. The method of claim 6, wherein the plurality of messages are a first plurality of messages, the method further comprising:
monitoring a second plurality of messages passed between a management engine (ME), a media access controller (MAC) and the network interface, the first plurality of messages being included in the second plurality of messages.

11. A system implemented in at least one of a non-transitory medium with instructions for execution on a processing device, a processing device or a combination thereof, comprising:
a convergence engine (CE) configured to receive a request from a high level engine (HLE) for a list of networks in range of a network interface;
the CE configured to send an instruction, in response to the request, to a management engine to (1) perform one or more scan requests for network portals in range of the network interface, (2) define a list of network portals, and (3) define a list of distinct networks based on the list of network portals;
the CE configured to receive the list of distinct networks from the management engine;
the CE configured to provide the list of distinct networks to the HLE as a response to the request from the HLE; and
the CE configured to receive from the HLE an instruction to associate with a network that is from the distinct list of networks and that is selected by the HLE.

12. The system of claim 11, further comprising the HLE configured to be coupled to the CE.

13. A method comprising:
receiving, at a high level engine, an indication of a waning network connection from a convergence engine;
requesting, by the high level engine, a list of networks in range of a network interface from the convergence engine, the list of networks based on one or more portal level scans such that the convergence engine define the list of networks by sorting the one or more portal level scans by network;
selecting, by the high level engine, a network from the list of networks to transition to; and
instructing, by the high level engine, the convergence engine to associate with the selected network.

14. The method of claim 13, further comprising identifying, by the convergence engine, a target network portal associated with the selected network.

15. A method comprising:
identifying a waning network connection;
transmitting a message to a high level engine indicating the waning connection;
receiving a reply message from the high level engine including an instruction to define a list of available networks;
transmitting a message to the high level engine including the list of available networks, the message not including a plurality of portal level connectivity messages;
receiving an instruction from the high level engine to join a new network from the list of networks, and selected by the high level engine from the list of networks;
selecting a network portal providing access to the new network from a plurality of network portals associated with the new network; and
transitioning to the new network via the network portal.

16. The method of claim 15, wherein the waning connection is to an 802.11 network and the new network is not an 802.11 network.

17. The method of claim 15 wherein the waning network connection is associated with a first connection device, the method further comprising, receiving a message including an instruction to activate a second connection device in response to receiving the instruction from the high level engine to join the new network.

18. The method of claim 15 wherein the waning network connection is associated with a first network interface, the method further comprising, activating a second network interface in response to receiving the instruction from the high level engine to join the new network.

19. The method of claim 15 wherein the waning network connection is associated with a first connection device, the method further comprising, activating a second connection device in response to receiving the instruction from the high level engine to join the new network.

* * * * *